United States Patent
Flannelly

[15] 3,685,314
[45] Aug. 22, 1972

[54] FLEXIBLE UNIVERSAL JOINT

[72] Inventor: William G. Flannelly, South Windsor, Conn.

[73] Assignee: Kaman Aerospace Corporation, Bloomfield, Conn.

[22] Filed: March 25, 1971

[21] Appl. No.: 127,887

[52] U.S. Cl. .................................................64/12
[51] Int. Cl. ..............................................F16d 3/62
[58] Field of Search............................64/11, 12, 13

[56] References Cited

UNITED STATES PATENTS

| | | | |
|---|---|---|---|
| 3,004,409 | 10/1961 | Grey | 64/12 |
| 3,481,158 | 12/1967 | Mayerjak | 64/12 |
| 3,521,465 | 7/1970 | Bossler, Jr. | 64/12 |

Primary Examiner—Kenneth W. Sprague
Attorney—McCormick, Paulding & Huber

[57] ABSTRACT

A flexible universal joint for connecting two elements having axes intersecting at the center of the joint comprises two sets of flexible members, each set being comprised of first and second flexible members, extending between the elements. Each flexible member has four leg sections serially interconnected and arranged in opposed pairs with connecting points located between the leg sections. Each set of flexible members is formed by joining one diagonal pair of connecting points on the first flexible member to a mating diagonal pair of connecting points on the second flexible member of the same set. The sets of flexible members extend coaxially of one another between the elements and are attached to the elements by means of the non-mated diagonal pairs of connecting points of each set. The attachment points of the non-mated pairs with each element are distributed at 90° intervals about the axes of the elements so that the two coaxial sets of flexible members have corresponding parts phased 90° from one another about the common axis of the sets and thereby cause the transverse bending axes of the flexible joint to be coincident at the geometric center of the joint.

10 Claims, 6 Drawing Figures

PATENTED AUG 22 1972 3,685,314

*INVENTOR.*
WILLIAM G. FLANNELLY

BY McCormick, Paulding & Huber

ATTORNEYS

FLEXIBLE UNIVERSAL JOINT

BACKGROUND OF THE INVENTION

This invention relates to a flexible universal joint or coupling for connecting two universally pivotable elements which are either rotatable or held rotatably fixed in their environment while pivoting with respect to one another about transverse bending axes between the pivotable elements.

Flexible joints comprising elastic members are well known in the art for connecting two pivotable elements with low or negligible friction factors. The elements may be rotatable elements with rotational axes aligned or at an angle to one another or rotationally stationary elements which are capable of changing angular position about two mutually perpendicular axes between the elements as in a gyroscopic gimbal system. A flexible coupling comprising two quadrilateral, flexible members is disclosed in U. S. Pat. No. 3,521,465 and is shown in simplified form in FIGS. 1 and 2 of this specification. The quadrilateral members have two diagonal pairs of vertices or connecting points joined together and the other two diagonal pairs of connecting points are connected respectively to the coupled elements. The leg sections of each element are elastically flexible and allow the coupled elements to pivot about transverse bending axes between the elements.

In flexible couplings of the prior art comprising first and second quadrilateral members having flexible leg sections, the transverse bending axes of the coupling, the axes about which pivotal motion occurs, are not all coincident at the geometric center of the coupling when one of the coupled elements is not supported in journal bearings or other fixtures which maintain a well-defined pivot point. In fact, two distinct and parallel bending axes extend through the diagonally located connecting points of the coupling attached to the coupled elements. A third bending axis oriented in a skewed transverse relationship with the other two bending axes passes through the joined or mated diagonal pairs of connecting points of the flexible members so that instead of two mutually perpendicular bending axes, such as found in conventional universal joints, the flexible coupling displays three distinct bending axes. While the separation of the two parallel bending axes is not of critical importance in many applications, there are other situations where it is desirable to provide an elastic equivalent of a universal joint, which in fact has coincident transverse bending axes without constraining the pivotable motions of both coupled elements by means other than the joint itself.

SUMMARY OF THE INVENTION

The present invention resides in a flexible universal joint for connecting a first element having a first axis with a second element having a second axis, the first and second axes intersecting at the center of motion of the joint. The joint comprises first and second coaxial sets of flexible members, each flexible member having four serially connected leg sections arranged in opposed pairs and extending between four vertices or connecting points arranged in opposed pairs between the leg sections. Each of the first and second coaxial sets are composed of first and second flexible members, the first flexible member of each set having the connecting points in one opposed pair joined respectively to the connecting points in one opposed pair on the second flexible member of the corresponding set. First attachment means couples the connecting points in the other opposed pair on the first flexible member of the first set to the first element on an axis intersecting the first axis of the first element, and second attachment means couples the connecting points in the other opposed pair on the first flexible member of the second set to the first element along an axis intersecting the first axis of the first element and generally perpendicular to a plane defined by the first axis and the axis along which the connecting points of the first member of the first set are attached to the first element. Third attachment means couples the connecting points in the other opposed pair on the second flexible member of the first set to the second element on an axis intersecting the second axis of the second element, and fourth attachment means couples the connecting points in the other opposed pair on the second flexible member of the second set to the second element along an axis intersecting the second axis of the second element and generally perpendicular to a plane defined by the second axis and the axis along which said connecting points of the second member of the first set are coupled to the second element. With the two sets of flexible members arranged coaxially and 90° out of phase due to the attachments with the elements, the flexible joint displays characteristics of having two mutually perpendicular and coincident bending axes as found in conventional universal joints.

DESCRIPTION OF THE PREFERRED EMBODIMENT

Figure 1:
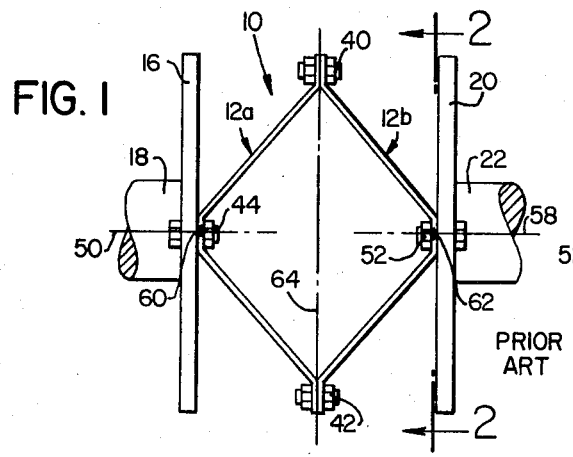
FIG. 1 is a front elevation view of a flexible coupling from the prior art.

Before a detailed description of a flexible universal joint according to the present invention is given, it will be advantageous to briefly describe a flexible coupling taken from the prior art as shown in U. S. Pat. No. 3,521,465, having the same assignee as the present invention. For this purpose, reference may be had to FIGS. 1 and 2 which disclose the prior art flexible coupling, generally designated 10, composed of two interconnected flexible members 12a and 12b which extend consecutively between a square flange 16 at one end of the shaft 18 and another square flange 20 connected to a shaft 22. The flexible members 12a and 12b have identical configurations and are referred to generally by the numeral 12. To distinguish between the individual members or the subcomponents of the members, a letter subscript, a or b, is appended to the general reference numeral. Each of the flexible members 12 is a quadrilateral composed of four leg sections 30, 32, 34 and 36 serially interconnected in a square configuration with four vertices or connecting points arranged in diagonal pairs at the junctions of the leg sections.

Figure 2:
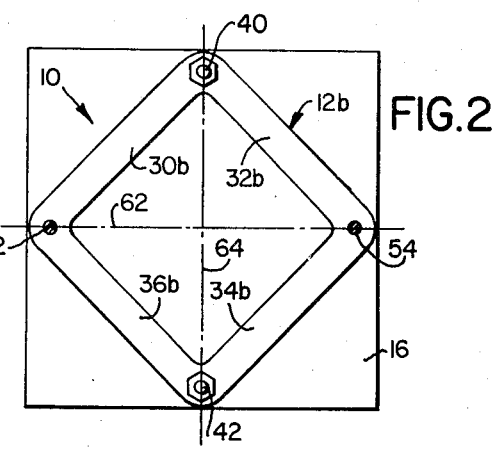
FIG. 2 is a sectional view of the prior art coupling as viewed along the sectioning line 2—2 in FIG. 1.

As seen most clearly in FIG. 1, bolts 40 and 42 join one diagonal pair of connecting points on the flexible member 12a to a mating diagonal pair of connecting points on the flexible member 12b. Additionally, a bolt 44 and another bolt (not shown) attach the non-mated diagonal pair of connecting points on the flexible member 12a to the flange 16 at positions centrally located about the central axis 50 of the shaft 18. In a similar manner, bolts 52 and 54 attach the non-mated diagonal pair of connecting points on member 12b to the flange 20 at positions centrally located about the central axis 58 of the shaft 22.

When the shafts 18 and 22 are pivoted with respect to one another in universal fashion, or caused to rotate with the axes 50 and 58 positioned at an angle to one another, the coupling 10 flexes about two distinct transverse and parallel bending axes 60 and 62 where the connecting points of the flexible members 12 join the flanges 16 and 20 respectively and another transverse bending axis 64 centrally located within the coupling and passing through the connecting points joined by bolts 40 and 42. It will be immediately noted that the axis 64 is located in skewed relationship to the axes 60 and 62 but has a generally transverse positional relationship with the axes 60 and 62. When the shafts 18 and 20, as seen in FIG. 1, are positioned at an angle to one another in the plane of the drawings, bending within the coupling 10 occurs about both of the axes 60 and 62. In contrast, when the shafts 18 and 22 are positioned at an angle to one another in a plane transverse to the axis 64, substantially all of the flexing of coupling 10 occurs about axis 64. Where it is critical that the pivotal motions in perpendicular planes occur about a common reference point, the prior art coupling 10 is unsatisfactory. Such criticality could arise, for example, in situations where the moment arm of a mass mounted on the shaft 22 must be the same for bending moments in two perpendicular planes intersecting along the axis 58. In such a case, while the axis 64 provides a definite reference point about which the bending moments normal to the plane of the figure take place, moments within the plane of the drawing have no definite center to operate about.

Figure 3:
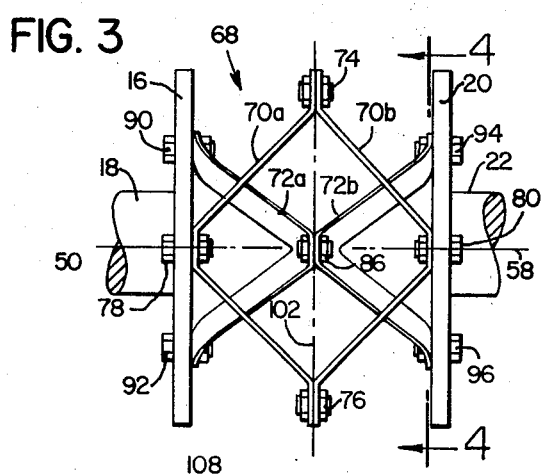
FIG. 3 is a front elevation view of a flexible universal joint embodying the present invention.
Figure 4:
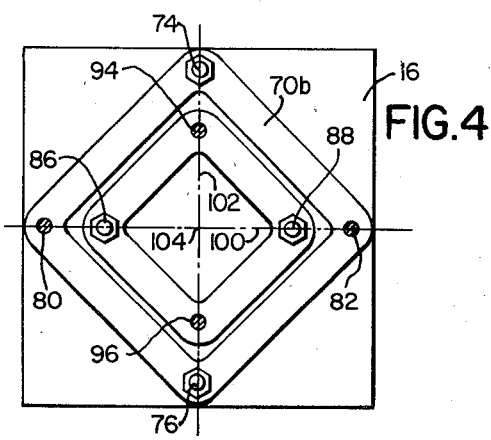
FIG. 4 is a sectional view of the flexible joint in FIG. 3 as viewed along the sectioning line 4—4.

With this brief understanding of the flexible couplings known in the prior art, attention may now be turned to FIGS. 3 and 4 which show a flexible universal joint embodying the present invention and generally designated 68. Similar to the joint 10 of FIG. 1, the joint 68 is shown to be employed for connecting the flange 16 at one end of the shaft 18 to the flange 20 at one end of the shaft 22. It comprises a first set of flexible members 70a and 70b and a second set of flexible members 72a and 72b coaxial with and phased 90° about the common axis with the first set (letter subscripts being appended to the reference numerals to distinguish between the members and subcomponents of the same set). Each of the flexible members 70a, 70b, 72a and 72b is a quadrilateral member composed of serially connected leg sections arranged in opposed pairs to form a square configuration and has diagonal pairs of connecting points located at the extremities of the leg sections. Bolts 74 and 76 join the mating diagonal pairs of connecting points on the flexible members 70a and 70b. A bolt 78 and another bolt (not shown) attach the non-mating diagonal pair of connecting points on flexible member 70a to the flange 16 at attachment points equidistant from the central axis 50 of shaft 18 and on a transverse or diametral axis of shaft 18, and bolts 80 and 82 attach the non-mating diagonal pair of connecting points on flexible member 70b to the flange 20 at attachment points equidistant from the central axis 58 of shaft 22 and on a diametral axis of the frequency, In a similar manner, bolts 86 and 88 joint the mating diagonal pairs of connecting points on the flexible members 72a and 72b. Bolts 90 and 92 connect the non-mating diagonal pair of connecting points on flexible member 72a to the flange 16 at positions equidistant from the axis 50 of shaft 18 and on a diametral axis of the shaft 18 and bolts 94 and 96 attach the non-mating diagonal pair of connecting points on flexible member 72b to the flange 20 at points equidistant from the axis 58 of shaft 22 and on a diametral axis of the shaft.

It should be noted that the attachment points of the first set of flexible members 70 to the flanges 16 and 20 are located on axes transverse to the axes 50 and 58 respectively and that the corresponding connecting points of the second set of flexible members 72 to the flanges are located along axes transverse to the axes 50 and 58 as well as the axes along which the first set of members 70 are attached. In effect, the flexible joint 68 of the present invention comprises two coaxial sets of flexible members oriented 90° out of phase with one another about the axes 50 and 58. This unique association of the flexible members with the shaft axes provides a universal pivotal motion of the one shaft with respect to the other, which motion takes place about a single point located concentrically within the flexible members 70 and 72 and additionally provides flexible restraint. Bending moments applied to the joint 68 as seen in FIG. 3 and operating in the plane of the drawing are constrained by the flexible members 72 to occur about an axis 100 extending between the bolts 86 and 88. Bending moments applied to the joint and operating to cause the shafts to move in or out of the plane of the drawings are constrained by the flexible members 70 to take place about the bending axis 102 extending between the bolts 74 and 76. Since the bending axes 100 and 102 intersect at a point centrally located within the two sets of flexible members, all motions resulting from bending moments about one or both of the axes 100 or 102 are centered at the point of coincidence 104 of the axes. The joint formed by the two sets of flexible members therefore provides a fixed reference point about which universal pivotal motions will occur.

It will be noted that the sets of flexible members 70 and 72 shown in the embodiment of the invention in FIGS. 3 and 4 are symmetrically positioned between the flanges 16 and 20 and have different sizes, that is, the diagonal and lateral dimensions of the flexible members 70a and 70b are larger than the corresponding dimensions of the flexible members 72a and 72b. Such a difference in size of the flexible members having a square configuration is necessitated in order to locate the sets of members 70 and 72 coaxially, one within the other, between the flanges 16 and 20 at the ends of shafts 18 and 22 respectively and thereby permits the bending axes 100 and 102 to fall into coincidence at the geometric center of the joint.

Figure 5:
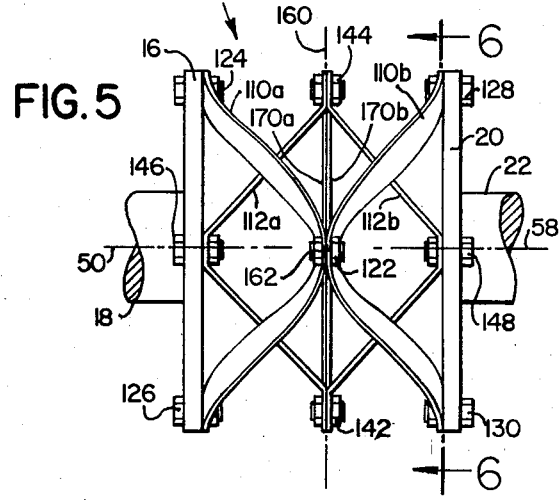
FIG. 5 is a front elevation view of another flexible universal joint embodying the present invention.
Figure 6:
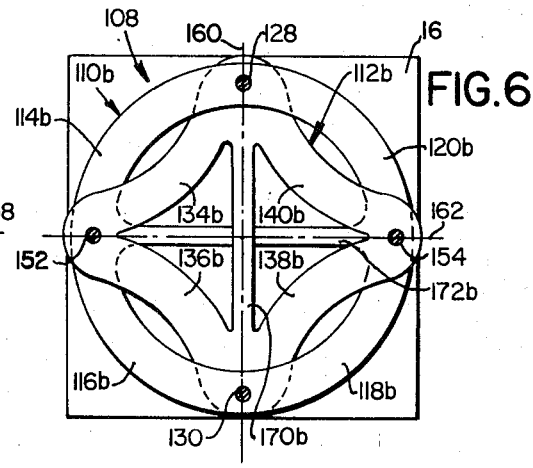
FIG. 6 is a sectional view of the flexible joint in FIG. 5 as viewed along the sectioning line 6—6.

Another flexible universal joint embodying the present invention is generally designated by numeral 108 in FIGS. 5 and 6. Turning to these figures, the joint 108 has basically the same construction as the joint in FIGS. 3 and 4 in that there are two coaxial sets of flexible members 110 and 112 (letter subscripts being appended to the reference numerals to distinguish between the flexible members of the same set and their subcomponents). A principal feature of the embodiment in FIGS. 5 and 6 is the fact that all of the connecting points of the flexible members 110 and 112 are located on circles of the same diameter centered on the shaft axes. The positioning of all connecting points at distances equidistant from the shaft axes provides leg sections of the same length in each set of flexible members and tends to equalize the spring constants of the flexible joint about each of the transverse bending axes of the joint.

The positioning of the flexible members having equal-length leg sections coaxially one within the other between the shafts 18 and 22 is permitted by the special configurations of the flexible members. As seen most clearly in FIG. 6, the flexible member 110b is a ring-shaped member with each of the serially connected leg sections 114b, 116b, 118b and 120b of the member forming one quarter of the ring. The mating flexible member 110a has the same construction and both members 110a and 110b have an opposed pair of connecting points joined respectively by a bolt 122 and another bolt (not shown). The remaining opposed pair of connecting points of flexible member 110a are joined to the flange 16 at points equidistant from the shaft axis 50 along a transverse or diametral shaft axis by means of bolts 124 and 126 respectively. Bolts 128 and 130 respectively joint the remaining pair of connecting points on flexible member 110b to the flange 20 at positions equidistant to the shaft axis 58 and along a diametral shaft axis. The flexible members 112a and 112b have similar configurations and are composed of curved leg sections 134, 136, 138 and 140, each having the same configuration as the leg sections composing the flexible members 110a and 110b; however, the leg sections of members 112a and 112b are serially interconnected with the centers of curvature of each section located externally of the members. The mating opposed pairs of connecting points on the members 112 at the central plane of the coupling are joined by means of bolts 142 and 144. The remaining opposed pair of connecting points on flexible members 112a are secured to flange 16 at stations equidistant from the shaft axis 50 and along a diametral shaft axis by means of a bolt 146 and another bolt (not shown). The corresponding pair of connecting points of flexible member 112b are joined to the flange 20 at stations equidistant from the shaft axis 58 and along a diametral shaft axis by means of bolts 152 and 154 respectively. The connecting points of the two coaxial sets of flexible members are located respectively on diametral axes which are perpendicular so that the corresponding parts of the coaxial sets are phased 90° from one another about the axis of the flexible joint. This positioning of the flexible members causes the transverse bending axes 160 and 162 of the joint to fall into coincidence at the geometric center of the joint as in the embodiment shown in FIGS. 3 and 4.

It is the reversed curvatures of the leg sections on the flexible members 110 and 112 which allow the connecting points to lie on coaxial circles of the same diameter since the curvatures of the sections avoid the mutual interference which would otherwise occur at the midpoints of the leg sections. The spring constants of each set of flexible members 110 and 112 are therefore substantially the same, assuming that the members are made from the same elastic material and have the same thickness, since the lengths of the leg sections between the connecting points and the angular relationships between the leg sections and adjacent flanges are the same. In contrast, a slight disparity in the spring constants about axes 100 and 102 in the joint 68 as shown in FIGS. 3 and 4 is traceable to the fact that the flexible members of each set are not the same size. Adjusting the thicknesses of the members can compensate for such disparity.

In addition to the similar sizes, the flexible elements 110 and 112 are modified to eliminate axial compliance in the joint 108. In particular, flexible members 112a and 112b are respectively provided with rigid bars 170a and 170b extending between the opposed pair of connecting points joined by the bolts 142 and 144. The bars 170a and 170b prevent the radial and axial dimensions of the flexible elements from varying. Of course, it will be readily apparent that although the bars are shown as integral portions of the flexible members, separate rigidizing members extending between the bolts 142 and 144 would serve the same function.

In the same respect, flexible members 110 are provided with transverse bars 172 extending between the opposed pair of connecting points joined by the bolt 122 and the other bolt (not shown). At the intersection of the rigidizing bars 170 and 172, the bars 170 are spread slightly so that they lie outside of the bars 172 as seen in FIG. 6. The rigidizing bars 172 also prevent the flexible members 110 from flexing in the radial and axial directions of the joint 108 and therefore assist the bars 170. Again, it will be understood that, although shown as integral portions of the flexible members 110, the bars 172 can be separately formed and captured between the bolts which join the members 110 at the central plane of the joint.

The flexible joint 108 shown in FIGS. 5 and 6 with rigidizing bars 170 and 172 provides the same coincidence of the transverse bending axes 160 and 162 as that which is provided by the embodiment of the invention in FIGS. 3 and 4. Since the rigidizing bars extend along the bending axes 160 and 162 defined by the flexible members 110 and 112, the bars do not affect the coincidence of the bending axes.

While the flexible universal joint of the present invention has been described in several preferred embodiments, it will be understood that numerous modifications and substitutions to the constructions shown can be had without departing from the spirit of the invention. For example, the rigidizing bars shown in the embodiment of the invention in FIGS. 5 and 6 can also be utilized in the embodiment of FIGS. 3 and 4. In addition, although each of the flexible members is shown as an integrally formed member, each of the leg sections may be a separate member which interlocks with the adjacent leg sections to form the quadrilateral or other configuration. Although the flexible members of a given set are shown as being joined at the mated connecting points by means of bolts, the members can also be welded together or integrally joined at the mating connecting points. The flexible universal joint may be utilized in a rotating environment as, for example, the coupling between two angled, rotating shafts, or in a non-rotating environment as, for example, a resilient universal pivot for mounting a gyroscope or connecting two non-rotating shafts. Accordingly, the present invention has been disclosed in several embodiments merely by way of illustration rather than limitation.

I claim:

1. A flexible universal joint for connecting a first element having a first axis with a second element having a second axis, the first axis and the second axis intersecting at the center of motion of the joint, comprising: first and second coaxial sets of flexible members, each flexible member having four serially interconnected leg sections arranged in opposed pairs and extending between four connecting points arranged in opposed pairs, each of said first and second coaxial sets being composed of first and second flexible members, the first flexible member of each set having the connecting points in one opposed pair joined respectively to the connecting points in one opposed pair on the second flexible member of the corresponding set; first attachment means for coupling the connecting points in the other opposed pair on the first flexible member of the first set to the first element on an axis intersecting the first axis of the first element; second attachment means for coupling the connecting points in the other opposed pair on the first flexible member of the second set to the first element along an axis intersecting the first axis of the first element and generally perpendicular to a plane defined by the first axis and the axis along which said connecting points of the first member of the first set are coupled to the first element; third attachment means for coupling the connecting points in the other opposed pair on the second flexible member of the first set to the second element on an axis intersecting the second axis of the second element; and fourth attachment means for coupling the connecting points in the other opposed pair on the second flexible member of the second set to the second element along an axis intersecting the second axis of the second element and generally perpendicular to a plane defined by the second axis and the axis along which said connecting points of the second member of the second set are coupled to the second element.

2. A flexible coupling as defined in claim 1 wherein the first and second flexible members of said second set extend substantially coaxially within the first and second flexible members of said first set between the first element and the second element.

3. A flexible coupling as defined in claim 1 wherein said first attachment means and said second attachment means couple the first flexible members of the first and second sets respectively to the first element coaxially about the first axis of the first element and along axes perpendicular to the first axis.

4. A flexible coupling as defined in claim 3 where said third attachment means and said fourth attachment means couple the second flexible members of the first and second sets respectively to the second element coaxially about the second axis of the second element and along axes perpendicular to the second axis.

5. A flexible coupling as defined in claim 1 wherein said flexible members are flexible rectangular members.

6. A flexible coupling as defined in claim 1 wherein the leg sections of the first and second flexible members of said first set are dimensionally longer than the leg sections of the first and second flexible members of the second set and the first and second flexible members of said second set extend between the first element and second element coaxially within the first and second flexible members of the first set.

7. A flexible coupling as defined in claim 1 wherein the first and second flexible members of the first set are rectangular members extending symmetrically from the joined connecting points of the first set to the first element and the second element respectively; and the first and second flexible members of the second set are rectangular members positioned coaxially within the first set of flexible members and extending symmetrically from the joined connecting points of the second set to the first element and the second element respectively.

8. A flexible coupling as defined in claim 1 wherein said first and second attachment means locate the other opposed pairs of connecting points of the first flexible members along axes perpendicular to each other and to the first axis; and said third and fourth attachment means locate the other opposed pairs of connecting points of the second members along axes perpendicular to each other and to the second axis.

9. A flexible coupling as defined in claim 1 wherein a first rigid member interconnects the joined opposed pairs of connecting points of the first set of flexible members whereby the joined connecting points of the first set of flexible members are held in fixed spacial relationship to one another; and a second rigid member interconnects the joined opposed pairs of connecting points of the second set of flexible members whereby the joined connecting points of the second set of flexible members are held in fixed spacial relationship to one another.

10. A flexible coupling as defined in claim 1 wherein the first and second sets of flexible members have leg sections of substantially the same length between connecting points; the first and second attachment means connect the other opposed pairs of connecting points on the first flexible members of both sets to the first element on a common circle perpendicular to and coaxial to the first axis; and the third and fourth attachment means connect the other opposed pairs of connecting points on the second flexible members of both sets to the second element on a common circle perpendicular to and coaxial to the second axis.

* * * * *